B. A. BALLINGER.
TRUCK.
APPLICATION FILED APR. 14, 1910.

990,416.  Patented Apr. 25, 1911.

Witnesses

Inventor
Bert. A. Ballinger
by
his Attorney

UNITED STATES PATENT OFFICE.

BERT A. BALLINGER, OF LOS ANGELES, CALIFORNIA.

TRUCK.

990,416.

Specification of Letters Patent. Patented Apr. 25, 1911.

Application filed April 14, 1910. Serial No. 555,537.

*To all whom it may concern:*

Be it known that I, BERT A. BALLINGER, a citizen of the United States, residing at Los Angeles, in the county of Los Angeles and State of California, have invented a certain new and useful Truck, of which the following is a specification.

This invention relates to a hand truck for transporting merchandise, barrels and other heavy articles, and has for its object to provide a truck capable of being readily and quickly converted into a "dolly" truck for moving such weighty commodities as safes and pianos which cannot be handled with a "push" or "pull" truck.

Other objects will appear from the following specification and claims, in connection with the accompanying drawing, in which—

Figure 1:
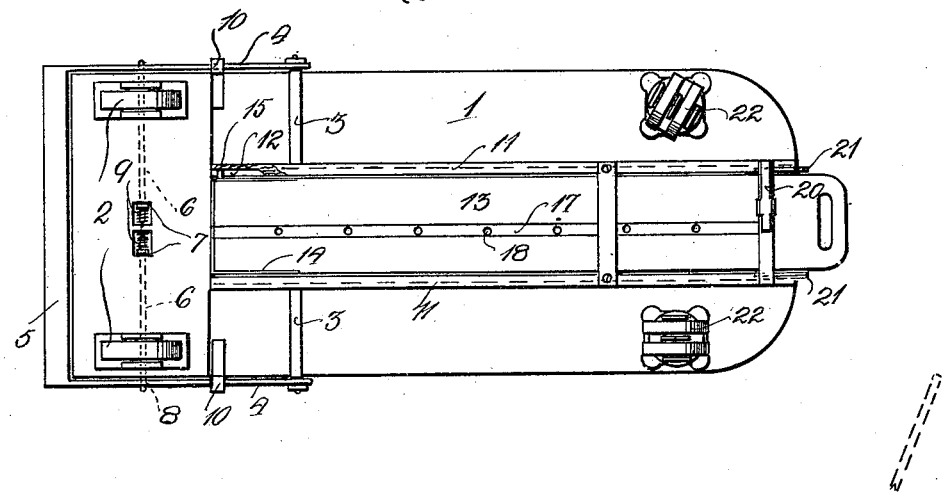
Figure 2:
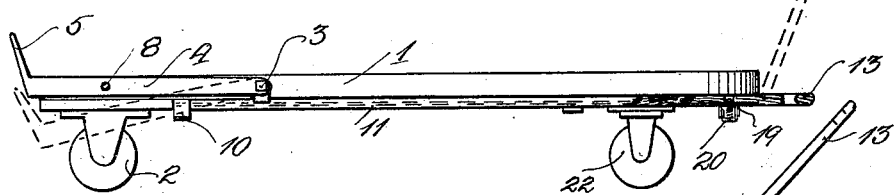
Figure 4:
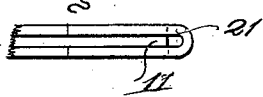
Figure 3:
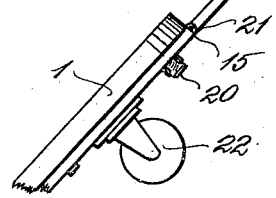
Figure 3:
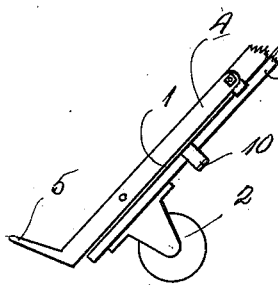

Figure 1, is a bottom plan view of my invention. Fig. 2, is a side elevation of the same showing in dotted lines the dropped position of the forward lip when the truck is to be used for large wares; the handle, in dotted lines, is shown in the position it occupies when the truck is to be drawn on all four wheels. Fig. 3, is a side elevation showing the handle slightly extended and the position of the truck when the same is used as a hand truck, and Fig. 4, is a fragmentary enlarged view showing the provision of hinges in the forward end of the guide strips.

The truck comprises a table, 1, provided with a pair of wheels 2. On the underside of the table 1, are secured two rods or bars 3 extending slightly beyond the edges of the table, which bars or rods form the pivot points for two arms 4, made integral with a lip 5, which extends beyond and free of the forward edge of the table 1. In the said table are housed two stems 6, provided with bent-up ends 7. The stems are held with normally protruding through orifices 8, in the arms 4, by helical springs 9. When the bent-up portions of the stems are pressed toward each other by the fingers, the ends of the stems are retracted allowing thereby the arms 4 and the lip 5, to drop in the position shown in dotted lines Fig. 2, in which position the uppermost edge of the lip 5, is below the surface of the table 1. The movement of the said lip to a point lower than that indicated is prevented by lugs 10, secured to the bottom of the table 1, and on which lugs the arms 4 rest when the pins 6 are withdrawn. The said lip and the arms 4 are then held in the lowered position when the stems 6, resume their normal position under the tension of the springs 9. On the bottom of said table are two guide strips 11, provided with grooves 12. Between said guide strips 11, is a handle 13, provided with a reinforcement 14, in the end thereof, and with two pins 15, extending and arranged to travel in the grooves 12 of the strips 11, when the handle 13 is withdrawn. On said handle is fastened a bar 17, provided at intervals with holes 18, in which a stud 19 of a spring latch 20 engages when the handle has been drawn out to the desired length. This provision is made for the purpose of increasing the leverage of the truck when tilted, and also to permit of the transportation of such articles as are larger than the area of the truck body where the truck is used as a push truck. Said guide strips 11, at their free ends are provided with U-shaped hinges 21, which form pivotal bearings for the aforementioned pins 15, when the handle is drawn out to its fullest extent, allowing thereby of the free movement of the same for pulling the truck. On the bottom of said table are pivoted universally movable casters 22, whereby the truck may be moved in any direction when used as a "dolly" truck or a "pull" truck. When used for transportation of ordinary articles, the truck occupies the position shown in Fig. 3, the handle 13, being left in its normal position as shown in Fig. 1, or extended as shown in Fig. 3, to increase the leverage.

What I claim, is:—

1. A truck comprising a table provided with a pair of wheels and a pair of universally movable casters, a lip pivoted to and extending slightly beyond the forward end of said table, a plurality of spring-actuated stems engaging said lip to hold same in normal position, means to withdraw said stems from engagement with said lip to cause said lip to drop below the surface of said table, a handle extensibly connected with said table, and a latch connected with said table and arranged to engage said handle to lock same at various points of extension.

2. A truck comprising a table provided with a pair of wheels and a pair of universally movable casters, a lip pivoted to the forward end and adjustable relatively to the surface of said table, means to lock said lip in position of adjustment, a handle on the bottom and disposed centrally of said table, said handle being extensible relatively to said table, and means to lock said handle at various points of extension.

3. A truck comprising a table provided with a pair of wheels and a pair of casters, a lip, means to normally suspend said lip at the forward end of said table, said means being actuable to release said lip from its suspended position whereby to cause the same to drop below the surface of the table, an extensible handle connected with said table, said handle being provided with pins, means on said table to prevent the complete withdrawal of said handle and forming pivotal bearings for said pins, and means to lock said handle in any position of extension.

4. A truck comprising a table provided with a pair of wheels and a pair of casters, a lip, means to normally suspend said lip, said means being operable to release said lip from its suspended position whereby to cause the same to drop below the surface of said table, a plurality of grooved guides on said table provided at one end thereof with hinges, an extensible handle between said guides and provided with pins extending and arranged to travel in the grooves of said guides, said pins being arranged to engage said hinges when said handle is entirely withdrawn, a perforated bar on said handle, and a spring-actuated latch engaging said perforations to lock said handle in various positions of extension when not entirely withdrawn.

5. A truck comprising a table provided with a pair of wheels and a pair of universally movable casters, a lip pivoted to said table and extending slightly beyond the forward end thereof, spring controlled means engaging said lip to hold same in normal position and actuable to release said lip to cause same to drop below the surface of said table, a handle disposed centrally of said table and extensible relatively thereto, a means to lock said handle at various points of extension whereby to push said truck in tilted position, and means to pivotally connect said handle, when entirely withdrawn, with said table whereby to pull the truck.

In testimony whereof I affix my signature in the presence of two witnesses.

BERT A. BALLINGER.

Witnesses:
ANTON GLOETZNER, Jr.,
F. J. MCCLARY.

---

Copies of this patent may be obtained for five cents each, by addressing the "Commissioner of Patents, Washington, D. C."